US012788015B2

(12) United States Patent
Blanding et al.

(10) Patent No.: US 12,788,015 B2
(45) Date of Patent: Nov. 10, 2026

(54) PLANT BIOLOGIC INCLUDING PYRROLOQUINOLINE QUINONE (PQQ)

(71) Applicant: Dakota Bio LLC, Kentland, IN (US)

(72) Inventors: Michael A. Blanding, Wolcott, IN (US); Jeffrey C. Steury, Suttons Bay, MI (US)

(73) Assignee: Dakota Bio LLC, Kentland, IN (US)

( * ) Notice: Subject to any disclaimer, the term of this patent is extended or adjusted under 35 U.S.C. 154(b) by 58 days.

(21) Appl. No.: 18/397,155

(22) Filed: Dec. 27, 2023

(65) Prior Publication Data

US 2024/0215583 A1 Jul. 4, 2024

Related U.S. Application Data

(60) Provisional application No. 63/477,578, filed on Dec. 29, 2022.

(51) Int. Cl.
*A01N 43/90* (2006.01)
*A01P 21/00* (2006.01)

(52) U.S. Cl.
CPC .............. *A01N 43/90* (2013.01); *A01P 21/00* (2021.08)

(58) Field of Classification Search
CPC ................................ A01N 43/90; A01P 21/00
See application file for complete search history.

(56) References Cited

U.S. PATENT DOCUMENTS 9,394,298 B2 7/2016 Ikemoto

FOREIGN PATENT DOCUMENTS

| | | | |
|---|---|---|---|
| CN | 102960350 | B | 9/2014 |
| CN | 105906450 | A | 8/2016 |
| CN | 107056782 | A | 8/2017 |
| WO | 2014027669 | A1 | 2/2014 |

OTHER PUBLICATIONS

Imran, Muhammad, et al., Application of Glycerin and Polymer Coated Diammonium Phosphate in Alkaline Calcareous Soil for Improving Wheat Growth, Grain Yield and Phosphorus Use Efficiency, Journal of Crop Science and Biotechnology, vol. 21, No. 5, pp. 425-434, 10 pages, Dec. 22, 2018.
PCT, Int. App. No. PCT/US2023/086030 International Search Report, 5 pages, May 2, 2024.
PCT, Int. App. No. PCT/US2023/086030 Written Opinion, 6 pages, May 2, 2024.
Carreño-López, et al., Pyrroloquinoline quinone (PQQ): Role in Plant-Microbe Interactions, pp. 169-184, 16 pages, Jan. 1, 2019.
Bhanja, et al., Study of Pyrroloquinoline Quinine From Phosphate-Solubilizing Microbes Responsible for Plant Growth: In silico Approach, Frontiers in Agronomy, Jun. 2021, vol. 3, pp. 1-24, 24 pages, Jun. 4, 2021.

*Primary Examiner* — Zohreh A Fay
(74) *Attorney, Agent, or Firm* — Woodard, Emhardt, Henry, Reeves & Wagner, LLP

(57) ABSTRACT

Unique compositions including pyrroloquinoline quinone have been developed in order to make pyrroloquinoline quinone more soluble in a liquid solution. The compositions may be applied to plants in order to increase overall plant health and yield. The compositions may include pyrroloquinoline quinone, a salt, an acid, and water. In one form, the composition includes pyrroloquinoline quinone, diammonium phosphate, phosphoric acid, and water. The composition may be created using various concentration levels of pyrroloquinoline quinone. These formulations may be applied to a seed, the soil, a furrow in the soil, and/or directly to the foliar of a plant to improve overall plant health.

20 Claims, 1 Drawing Sheet

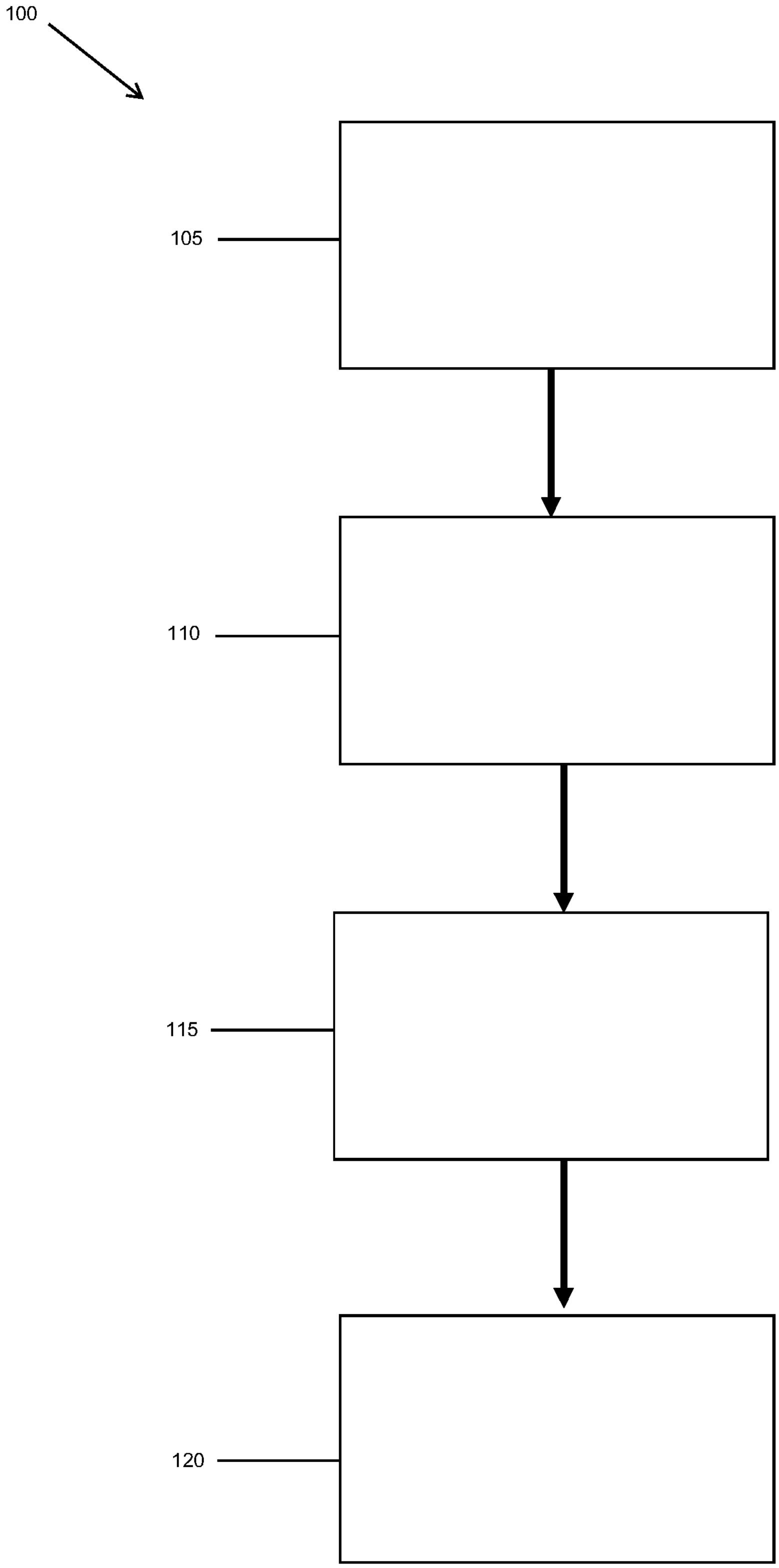
100
105
110
115
120

PLANT BIOLOGIC INCLUDING PYRROLOQUINOLINE QUINONE (PQQ)

CROSS REFERENCE TO RELATED APPLICATIONS

This application claims the benefit of U.S. Patent Application No. 63/477,578, filed Dec. 29, 2022, which is hereby incorporated by reference.

BACKGROUND

Plant health and yield is a key concern in the agricultural and horticultural fields. Plant stress is a key contributor to decline in plant health and yield. Plant stress has been amplified by climate change. Products to help increase plant health and yield are desirable.

Thus, there is a need for improvement in this field.

SUMMARY

Pyrroloquinoline quinone (also known as PQQ) is an antioxidant that is generally known for its potential benefits for mammalian health. PQQ is commonly produced by bacteria. While known for its potential benefits in mammals, it has been unexpectedly discovered that PQQ promotes plant health. It has been theorized that PQQ likely affects the mitochondrial health, energy output, nutrition consumption efficiency, and ability to repair damage mitochondria in plants. Thus, it is thought that PQQ is beneficial to combat plant stress, assist in recovery from stress, and increase nutrient use efficiency. Often, nutrients exist in a state that are inaccessible to a plant such that these nutrients need to be converted to a state that is accessible for plant uptake.

It has been discovered that PQQ is not extremely soluble in liquids such as water. Due to this low level of solubility, PQQ is more often suspended within a liquid. However, PQQ typically settles out of suspension rather quickly such that PQQ products often lose their effectiveness in a short period of time. It has been therefore difficult to produce PQQ commercial products that have a long enough shelf life. This in turn makes applying PQQ to plants, especially in mass commercial farming, difficult.

Unique formulations of PQQ have been developed to make PQQ more soluble in liquid mixtures, such as those containing water. Some unique methods of applying or otherwise using this PQQ formulation for plants have also been developed. In one form, the formulation includes PQQ, diammonium phosphate, phosphoric acid, and water. In some examples, the PQQ is a powdered PQQ and/or PQQ provided with bacteria. These novel PQQ formulations may be prepared using a variety of PQQ concentrations. In one example, the formulation may include 2560 grams of PQQ, 2.5 kilograms of diammonium phosphate, 100 gallons of water. These ingredients are mixed until at least partially blended and liquified. Phosphoric acid is added to the mixture to obtain a pH of 6.7-7.2. In some embodiments, phosphoric acid is added to the mixture to obtain a pH of 6.7-7.0. This formulation is generally applied directly to a seed. In another example, the formulation may include 640 grams of PQQ, 2.5 kilograms of diammonium phosphate, 100 gallons of water. These ingredients are mixed until at least partially blended and liquified. Phosphoric acid is added to the mixture to obtain a pH of 6.7-7.0. This formulation is generally applied to a furrow or directly to the foliar of a plant.

The systems and techniques as described and illustrated herein concern a number of unique and inventive aspects. Some, but by no means all, of these unique aspects are summarized below.

Aspect 1 generally concerns a composition.

Aspect 2 generally concerns the composition of any previous aspect including a pyrroloquinoline quinone (PQQ) mixture.

Aspect 3 generally concerns the composition of any previous aspect in which the PQQ mixture includes PQQ, a salt, and water.

Aspect 4 generally concerns the composition of any previous aspect in which the PQQ is in a powdered form.

Aspect 5 generally concerns the composition of any previous aspect in which the salt is diammonium phosphate.

Aspect 6 generally concerns the composition of any previous aspect in which the PQQ mixture includes an acid.

Aspect 7 generally concerns the composition of any previous aspect in which the acid is phosphoric acid.

Aspect 8 generally concerns the composition of any previous aspect in which the acid and salt form a buffer.

Aspect 9 generally concerns the composition of any previous aspect in which the acid protonates nitrogen to increase the solubility of PQQ.

Aspect 10 generally concerns the composition of any previous aspect in which the PQQ mixture includes 640 grams of PQQ.

Aspect 11 generally concerns the composition of any previous aspect in which the PQQ mixture includes 2560 grams of PQQ.

Aspect 12 generally concerns the composition of any previous aspect in which the PQQ mixture includes 2.5 kilograms of diammonium phosphate.

Aspect 13 generally concerns the composition of any previous aspect in which the PQQ mixture includes 100 gallons of water.

Aspect 14 generally concerns the composition of any previous aspect including a formulation to dissolve PQQ in a liquid solution.

Aspect 15 generally concerns the composition of any previous aspect in which the PQQ mixture includes winery grade diammonium phosphate.

Aspect 16 generally concerns the composition of any previous aspect in which the PQQ of the PQQ mixture stays in the solution for at least 30 days.

Aspect 17 generally concerns the composition of any previous aspect in which the PQQ of the PQQ mixture stays in the solution for at least a year.

Aspect 18 generally concerns the composition of any previous aspect in which the PQQ of the PQQ mixture stays in the solution for at least two years.

Aspect 19 generally concerns a method.

Aspect 20 generally concerns the method of any previous aspect including creating a Pyrroloquinoline quinone (PQQ) mixture.

Aspect 21 generally concerns the method of any previous aspect in which the PQQ mixture is a liquid solution.

Aspect 22 generally concerns the method of any previous aspect including adding PQQ, a salt, and water to a container.

Aspect 23 generally concerns the method of any previous aspect including adding an acid to the container.

Aspect 24 generally concerns the method of any previous aspect including mixing the PQQ until liquified.

Aspect 25 generally concerns the method of any previous aspect including adjusting the pH by adding an acid to the PQQ mixture.

Aspect 26 generally concerns the method of any previous aspect in which the pH of the PQQ mixture is between 6.7 and 7.0.

Aspect 27 generally concerns the method of any previous aspect including purifying the water through a reverse osmosis purification process.

Aspect 28 generally concerns the method of any previous aspect including mixing the PQQ mixture with other products.

Aspect 29 generally concerns the method of any previous aspect including mixing the PQQ mixture with water, seed treatments, fertilizers, herbicides, insecticides, and/or fungicides.

Aspect 30 generally concerns the method of any previous aspect including extracting PQQ from bacteria.

Aspect 31 generally concerns the method of any previous aspect in which the bacteria includes methylotrophic bacteria.

Aspect 32 generally concerns the method of any previous aspect including mixing the PQQ mixture with legume inoculants, bacillus, endophytes, phosphorus solubilizing biologicals, and/or nitrogen fixing biologicals.

Aspect 33 generally concerns the composition of any previous aspect in which the PQQ mixture has a red color shade.

Aspect 34 generally concerns the composition of any previous aspect in which the red color shade includes vermillion, carmine, cerise, garnet, rouge, scarlet, crimson, ruby, cherry, tomato, maroon, burgundy, rust, brick, blood, coral, salmon, rose, blush, and/or terracotta color shades.

Aspect 35 generally concerns the method of any previous aspect in which the PQQ mixture has a pink color.

Aspect 36 generally concerns the method of any previous aspect in which the PQQ mixture includes an *Acetobacter*.

Aspect 37 generally concerns a composition or method.

Aspect 38 generally concerns the composition or method of any previous aspect including utilizing a pyrroloquinoline quinone (PQQ) mixture to improve plant health.

Aspect 39 generally concerns the composition or method of any previous aspect including applying the PQQ mixture to a foliar of a plant.

Aspect 40 generally concerns the composition or method of any previous aspect including applying a high concentration of the PQQ mixture.

Aspect 41 generally concerns the composition or method of any previous aspect including applying a low concentration of the PQQ mixture.

Aspect 42 generally concerns the composition or method of any previous aspect including applying the PQQ mixture to soil.

Aspect 43 generally concerns the composition or method of any previous aspect including applying the PQQ mixture in a furrow of soil.

Aspect 44 generally concerns the composition or method of any previous aspect including applying the PQQ mixture to a seed.

Aspect 45 generally concerns the composition or method of any previous aspect including utilizing PQQ to improve mitochondrial health of a plant.

Aspect 46 generally concerns the composition or method of any previous aspect including utilizing the PQQ mixture to improve mitochondrial energy output.

Aspect 47 generally concerns the composition or method of any previous aspect including utilizing PPQ to improve nutrient consumption efficiency of a plant.

Aspect 48 generally concerns the composition or method of any previous aspect in which the nutrient is phosphorous.

Aspect 49 generally concerns the composition or method of any previous aspect including utilizing PPQ to assist in the repair of mitochondria function of a plant.

Aspect 50 generally concerns the composition or method of any previous aspect including utilizing PQQ to alleviate plant stress.

Aspect 51 generally concerns the composition or method of any previous aspect in which the plant includes corn, soybean, wheat, tomatoes, turf grasses, alfalfa, and/or many other field crop and ornamental plants.

Aspect 52 generally concerns the composition or method of any previous aspect in which the ornamental plants include inpatients and/or petunias.

Aspect 53 generally concerns the composition or method of any previous aspect including applying a low concentration formula of the PQQ mixture to soil, foliar of plants, and/or mixed with another product.

Aspect 54 generally concerns the composition or method of any previous aspect including applying a high concentration formula of the PQQ mixture directly to a seed.

Aspect 55 generally concerns the composition or method of any previous aspect in which the pH of the PQQ mixture is between 6.7 and 7.2.

Aspect 56 generally concerns the composition or method of any previous aspect including mixing the solution at 18.3° C.-48.9° C.

Aspect 57 generally concerns the composition or method of any previous aspect including mixing the solution at 25° C.

Aspect 58 generally concerns the composition or method of any previous aspect including storing the PQQ mixture at 25° C.

Aspect 59 generally concerns the composition or method of any previous aspect including storing the PQQ mixture at 4.4° C.-25° C.

Aspect 60 generally concerns the composition or method of any previous aspect in which the PQQ of the PQQ mixture stays in the solution for at least three years.

Aspect 61 generally concerns the composition or method of any previous aspect including storing the PQQ mixture in a sealed, fluid-tight container.

Aspect 62 generally concerns the composition or method of any previous aspect including conducting a stability test on the mixture.

Aspect 63 generally concerns the composition or method of any previous aspect in which the stability test is a visual stability test.

Aspect 64 generally concerns the composition or method of any previous aspect in which the PQQ mixture passes the stability test if no particulates are observed.

Aspect 65 generally concerns the composition or method of any previous aspect including measuring the absorbance of the mixture using a colorimeter to obtain the concentration of PQQ in the PQQ mixture.

Aspect 66 generally concerns the composition or method of any previous aspect including measuring the absorbance of the mixture using a spectrometer to obtain the concentration of PQQ in the PQQ mixture.

Aspect 67 generally concerns the composition or method of any previous aspect including measuring the absorbance of the mixture using a refractometer to obtain the concentration of PQQ in the PQQ mixture.

Aspect 68 generally concerns the composition or method of any previous aspect in which the plant includes corn, soybeans, wheat, potatoes, tomatoes, turf grasses, pansies, dahlias, jalapenos, banana peppers, marigolds, geraniums, habaneros, nasturtium, cosmos, hydrangeas, spinach, lettuce, broccoli, brussel sprouts, oregano.

Aspect 69 generally concerns the composition or method of any previous aspect including a 4.11% increase in yield per acre of corn.

Aspect 70 generally concerns the composition or method of any previous aspect including a 2.62% increase in yield per acre of soybean.

Aspect 71 generally concerns the composition or method of any previous aspect including a 1.87% increase in yield per acre of winter wheat.

Further forms, objects, features, aspects, benefits, advantages, and embodiments of the present invention will become apparent from a detailed description and drawings provided herewith.

BRIEF DESCRIPTION OF THE DRAWINGS

FIG. 1 is a flowchart of a method of preparing a formulation with PQQ and applying the formulation.

DETAILED DESCRIPTION OF SELECTED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Once more, Pyrroloquinoline quinone (PQQ) is an antioxidant generally known for potentially benefiting mammalian health. While known for potential benefits in mammals, PQQ has been unexpectedly discovered to also promote plant health. It is thought that PQQ is beneficial to combat plant stress, assist in recovery from stress, and/or increase nutrient uptake. Often, nutrients, such as phosphate, exist in a state that is not accessible to plants. Therefore, it is desirable for these nutrients to be converted to a state accessible for plant uptake. It is theorized that PQQ assists in converting phosphorus (and/or other nutrients) in the soil to make the phosphorus available for plants to uptake and use the phosphorus as a nutrient.

However, applying PQQ to plants and soil, especially in mass quantities, has been found to be difficult. For instance, it has been observed that PQQ can be difficult to dissolve in liquid mixtures. For instance, PQQ has a solubility of around 0.2118 g/L at 25 degrees Celsius in liquid water. In most cases, rather than dissolving, PQQ is initially suspended within a liquid solution, but the PQQ later settles out of this suspension. Once settled, the PQQ generally becomes ineffective and is inaccessible for a plant to uptake. For example, the PQQ quickly settles out of suspension onto the bottom of any storage container which in turn inhibits the spraying or otherwise applying the PQQ onto the plants and/or soil. This inability for PQQ to remain dissolved and/or suspended is exacerbated when out in commercial agricultural fields, because the solution is typically kept in large drums or other large containers that are difficult to agitate or otherwise move so as to maintain the suspension. Moreover, there is currently no commercially practical way to dissolve PQQ in a liquid mixture to mass produce a product useful in agricultural and/or horticultural situations (i.e., growing of ornamental plants).

One or more unique formulations of PQQ have been developed to increase the solubility PQQ in a liquid, such as water, and/or to keep the PQQ in suspension in the liquid for extended periods of time. Moreover, one or more unique processes for creating the PQQ mixture have also been developed. In one version, the PQQ mixture includes PQQ, an ammonium salt, an acid, and water. It is believed that the acid protonates the nitrogen in PQQ to create a conjugate acid. This reaction increases the solubility of PQQ, and this in turn increases the amount of PQQ that can be dissolved in the liquid solution. The salt and acid interact to form a buffer system with a pH between 6.7-7.2. In some embodiments, the pH may be between 6.7-7.0. It is theorized that operating within this buffer range increases the solubility of the PQQ within the solution. In some embodiments, the PQQ mixture is produced and/or mixed between 18.3° C.-48.9° C. (65° F.-120° F.). It is understood that lower or higher mixing temperatures may be used to produce PQQ mixtures. In theory, the mixtures produced outside of the recommended ranges would result in less PQQ dissolving in solution. Therefore, the concentration of PQQ would be lower.

In some examples, the source of PQQ could be in a powdered state. Alternatively or additionally the PQQ is generated by and/or extracted from bacteria, for example from methylotrophic bacteria and/or *Acetobacter*. In one version, the water is purified using a reverse osmosis purification process. Often, but not always, the liquid mixture is a shade of pink, depending on the concentration of the PQQ in the mixture. In some examples, the PQQ mixture can have a red color shade. For instance, the red color shade of the PQQ mixture in some cases can include vermillion, carmine, cerise, garnet, rouge, scarlet, crimson, ruby, cherry, tomato, maroon, burgundy, rust, brick, blood, coral, salmon, rose, blush, and/or terracotta color shades.

The ingredients of the formulation can be combined to form a homogenous solution or other mixture. Conventional equipment as well as heating and agitating conditions, as necessary, can be further employed when producing the PQQ solution. This formulation and technique facilitates the formation of storage stable solutions of PQQ. The formation of storage stable solutions, for example those that exhibit the capacity to remain clear solutions without any phase separation are desirable. For example, the resulting PQQ solution exhibits the capacity to remain as a homogenous and/or clear solution without any phase separation for a period of at least 30 days when maintained between 4.4° C.-25° C. (40° F.-77° F.). In certain cases, the resulting PQQ solution exhibits the capacity to remain as a homogenous and/or clear solution without any phase separation for at least a year when maintained between 4.4° C.-25° C. (40° F.-77° F.) in a stationary condition. In some instances, PQQ may stay in solution for at least two years. In alternative instances, the solution may remain a homogenous and/or clear solution for up to three years or more. Such maintenance over time will typically be in a sealed, fluid-tight inert container.

The new PQQ formulation may be composed with varying concentration levels of PQQ relative to the amount added of each of the rest of the ingredients.

In order to determine whether PQQ has been dissolved in solution or remains in solution, a variety of techniques may be used. In theory, using the unique formulations disclosed herein, PQQ should fully dissolve in solution. Therefore, PQQ should not precipitate out of solution if fully dissolved. In one embodiment, a visual stability test may be used to determine if the PQQ mixture is stable. The visual stability test includes monitoring the solution for particulates settling to the bottom of the mixture's storage container and/or floating in the mixture. If no particulates are observed, the PQQ has fully dissolved in solution and/or remains in solution. In another embodiment, a colorimeter to measure the absorption of the solution in order to determine if the proper concentration of PQQ has been reached. This indicates whether PQQ has fully dissolved in solution and/or remains in solution. In alternative embodiments, a spectrometer may be used to measure the absorption of the solution in order to determine if the proper concentration of PQQ has been reached. This indicates whether PQQ has fully dissolved in solution and/or remains in solution. In yet another embodiment, a refractometer may be used to measure the concentration of the solution in order to determine if the proper concentration of PQQ has been reached. Again, this indicates whether PQQ has fully dissolved in solution and/or remains in solution. In other embodiments, additional, non-limiting methods and/or devices such as a gas chromatograph, flame atomic absorption spectroscopy, a pH meter and/or redox or acid/base titrations may be used.

Example 1

In one non-limiting example, the formulation includes 2,560 grams of PQQ, 2.5 kilograms of Diammonium Phosphate, and 100 gallons of water purified using a reverse osmosis purification process (25.6 grams/1 gallon of water added). These ingredients are mixed in a container at 18.3° C.-48.9° C. (65° F.-120° F.) until blended and suspended in a liquid. Phosphoric acid is added to the mixture to obtain a pH of between 6.7-7.2. In some embodiments, phosphoric acid is added to the mixture to obtain a pH of between 6.7-7.0. Formulations with a concentration as described in example 1 is generally applied directly to a seed.

Example 2

In another illustrative example, the low concentration formula includes 640 grams of PQQ, 2.5 kilograms of Diammonium Phosphate, and 100 gallons of water purified using a reverse osmosis purification process (6.4 grams/1 gallon of water added). These ingredients are mixed in a container at 18.3° C.-48.9° C. (65° F.-120° F.) until blended and suspended in a liquid. Phosphoric acid is added to the mixture to obtain a pH of between 6.7-7.2. In some embodiments, phosphoric acid is added to the mixture to obtain a pH of between 6.7-7.0. Formulations with a concentration as described in example 2 is generally applied to a furrow in the soil, the soil, and/or directly to the foliar of a plant.

The formulations with PQQ may be applied with and/or mixed with other products, such as water, seed treatments, fertilizers, herbicides, and/or fungicides. The PQQ formulations may also be applied with and/or mixed with specific plant biologicals, such as legume inoculants, bacillus, endophytes, phosphorus solubilizing biologicals, nitrogen fixing biologicals, etc.

The formulations with PQQ may be used on a variety of plants to increase yields, overall plant health, blooms, bloom quantity and/or root size. Some non-limiting examples include corn, soybeans, wheat, potatoes, tomatoes, turf grasses, pansies, dahlias, jalapenos, banana peppers, marigolds, geraniums, habaneros, nasturtium, cosmos, hydrangeas, spinach, lettuce, broccoli, brussel sprouts, oregano and many other ornamental flowers (i.e., impatiens, petunias, etc.) and house plants. One or more studies seem to indicate that applying the disclosed mixture increases the overall plant health. It is theorized that the formulations with PQQ disclosed herein could be used on any plant to increase overall plant health.

Example 3—PQQ Mixture Testing

Studies were conducted to quantify the yield increase of various agricultural plants when treated with the unique PQQ formulations disclosed herein. The PQQ formulations were tested by hiring independent research farms to replicate and test plants treated with the unique PQQ formulations against plants that were not treated with PQQ formulation. Both the treated and nontreated plants were under identical conditions. The tests were conducted from 2020 to 2022 across one hundred and fifty-two research farm trials, at twelve different locations, across seven different states. Three different crops were tested, including corn, soybeans and winter wheat. Three different application methods were tested, including application directly to the foliar of a plant, application to a furrow in the soil, and application directly to a seed. Overall, the testing demonstrated an unexpected win rate of 93.5%.

Corn was tested using eighty-nine research farm trials, at twelve different locations, across seven states. The corn testing demonstrated a 92.5% win rate. The average yield increase was 9.57 bushels per acre. This bushel increase equates to a 4.11% average yield increase.

Soybean was tested using sixty-two research farm trials, at eleven different locations, across five states. The soybean testing demonstrated a 94.7% win rate. The average yield increase was 1.91 bushels per acre. This bushel increase equates to a 2.62% average yield increase.

Winter wheat was tested using twelve research farm trials, at two different locations, across two states. The winter wheat testing demonstrated a 100% win rate. The average yield increase was 1.58 bushels per acre. This bushel increase quates to a 1.87% average yield increase.

These controlled study results agree with qualitative field observations suggesting an increase in overall plant health when a plant is treated with the unique PQQ formulations disclosed herein.

FIG. 1 illustrates flowchart 100 of a method of dissolving PQQ in a liquid and applying the liquid to a seed, soil and/or the foliar of a plant. In stage 105, the ingredients, including PQQ, diammonium phosphate and water, are added to a mixing container. In stage 110, the ingredients are blended sufficiently to dissolve the PQQ in the liquid water. In stage 115, phosphoric acid is added as necessary to the mixture to achieve the desired pH. In some embodiments, the desired pH is between 6.0 and 8.0. More preferably, the desired pH is between 6.5 and 7.5. Even more preferably, the desired pH is between 6.7 and 7.0. In stage 120, the mixture may be applied in a variety of ways. In one example, the mixture is applied directly to the seed of a plant. In an alternative or additional example, the mixture is applied directly to the soil, often within a furrow. In an alternative or additional example, the mixture is applied directly to the foliar of the plants.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Acid" generally refers to a molecule or ion capable of either donating a proton (i.e., hydrogen ion, H+), known as a Brønsted-Lowry acid, or forming a covalent bond with an electron pair, known as a Lewis acid. Some non-limiting examples include monoprotic, diprotic and triprotic acids. Some non-limiting examples include phosphoric acid and citric acid.

"Bacteria" generally refers to ubiquitous, mostly free-living organisms often consisting of one biological cell. Non-limiting examples include methylotrophic bacteria and *Acetobacter*.

"Biologicals" or "Biologic" generally refers to a category of plant protection products that are derived from living organisms. Biologicals can enhance the plant health, fight pathogens, and increase the nutritional uptake of plants. Non-limiting examples include legume inoculants, bacillus, endophytes, phosphorus solubilizing biologicals and nitrogen fixing biologicals.

"Buffer" generally refers to an aqueous solution consisting of a mixture of a weak acid and its conjugate base, or vice versa. Its pH changes very little when a small amount of strong acid or base is added to it. Buffer solutions are used as a means of keeping pH at a nearly constant value in a wide variety of chemical applications.

"Cavity" generally refers to an empty space in a solid object. The cavity can be completely or partially surrounded by the solid object. For example, the cavity can be opened to the surrounding environment.

"Chemical Products" generally refers to plant health products not derived from living organisms. Non-limiting examples include seed treatments, fertilizers, herbicides, fungicides and pesticides.

"Clear" means a substantially transparent substance, material or solution. Clear here also includes the lack of an undissolved particulate.

"Container" generally refers to an object creating a partially or fully enclosed space that can be used to contain, store, and transport objects, items, and/or materials. In other words, a container can include an object that can be used to hold or transport something. By way of non-limiting examples, containers can include boxes, cartons, plastic packaging, totes, pallet totes, bags, jars, envelopes, barrels, cans, bottles, drums, packages, vats, Erlenmeyer flasks, beakers and round-bottom flasks.

"Dissolve" generally refers to the act of becoming or cause to become incorporated into a liquid so as to form a solution.

"Foliar" generally refers to the leafy biomass of a plant.

"Furrow" refers generally to a trench in the soil often made by a plow.

"High concentration mixture" generally refers to a mixture, including PQQ, diammonium phosphate, water and phosphoric acid. The high concentration mixture includes a higher concentration of PQQ relative to the low concentration mixture. The mixture may include 2560+/−10% grams of PQQ. More preferably, the mixture may include 2560+/−5% grams of PQQ. Even more preferably, the mixture may include exactly 2560 grams of PQQ. The mixture may further include 2.5+/−10% kilograms of diammonium phosphate. More preferably, the mixture may include 2.5+/−5% kilograms of diammonium phosphate. Even more preferably, the mixture may include exactly 2.5 kilograms of diammonium phosphate. The mixture may further include 100+/−10% gallons of water. More preferably, the mixture may include 100+/−5% gallons of water. Even more preferably, the mixture may include exactly 100 gallons of water.

"Homogenous Solution" generally refers to a gaseous, liquid or solid mixture that has substantially the same proportions of its components throughout. There is only one phase of matter in a single homogenous solution.

"Liquid" generally refers to a fluid that has no independent shape but has a definite volume and does not expand indefinitely and that is only slightly compressible.

"Low Concentration Mixture" generally refers to a mixture, including PQQ, diammonium phosphate, water and phosphoric acid. The low concentration mixture includes a lower concentration of PQQ relative to the high concentration mixture. The mixture may include 640+/−10% grams of PQQ. More preferably, the mixture may include 640+/−5% grams of PQQ. Even more preferably, the mixture may include exactly 640 grams of PQQ. The mixture may further include 2.5+/−10% kilograms of diammonium phosphate. More preferably, the mixture may include 2.5+/−5% kilograms of diammonium phosphate. Even more preferably, the mixture may include exactly 2.5 kilograms of diammonium phosphate. The mixture may further include 100+/−10% gallons of water. More preferably, the mixture may include 100+/−5% gallons of water. Even more preferably, the mixture may include exactly 100 gallons of water.

"Mammals" generally refers to a group of vertebrate animals constituting the class Mammalia, characterized by the presence of mammary glands. A non-limiting example includes *Homo sapiens* (i.e. humans).

"Mixture" generally refers to a material made up of two or more different chemical substances which are not chemically bonded. A mixture is the physical combination of two or more substances in which the identities are retained and are mixed in the form of solutions, suspensions and colloids.

"Ornamental Plants" or "Garden Plants" generally refer to plants that are grown for decorative purposes. Non-limiting examples include impatiens, petunias, roses, lavender, sage, tulips, marigold, a variety of trees and shrubs.

"Plant" generally refers photosynthetic eukaryotes of the kingdom Plantae. Plant typically refers to the possession of the following traits: multicellularity, possession of cell walls containing cellulose, and the ability to carry out photosynthesis with primary chloroplasts. Plants include bryophytes, pteridophytes, gymnosperms, and angiosperms trees. Some non-limiting examples of plants include trees, shrubs, herbs, grasses, ferns, mosses, liverworts, flowering plants, mushrooms, fungi, conifers, and cycads.

"Plant Stress" generally refers to external environmental conditions that adversely affect growth, development or productivity of plants. Non-limiting examples include extreme temperatures, flood or drought, chemical (contaminated soil or herbicide drift), insects, microbial stressors (mildews, fungi, viruses and bacteria), weeds and access to key nutrients, such as nitrogen and phosphorous.

"Pyrroloquinoline quinone" (also known as PPQ or methoxatin) generally refers to 4,5-Dioxo-4,5-dihydro-1H-pyrrolo[2,3-f]quinoline-2,7,9-tricarboxylic acid. The chemical formula is C14H6N2O8. PPQ is a redox cofactor and antioxidant. Often, PPQ is produced by bacteria. It is found in soil and foods such as kiwifruit, as well as human breast milk.

"Reverse Osmosis" generally refers to a water purification process that uses a semi-permeable membrane to filter out unwanted molecules and large particles such as contaminants and sediments like chlorine, salt, and dirt from drinking water. For example, when pressure is applied to a volume of saltwater during reverse osmosis, the salt is left behind and only clean water flows through.

"Salt" generally refers to a chemical compound consisting of an ionic assembly of positively charged cations and negatively charged anions, which results in a compound with no net electric charge. A common example is table salt, with positively charged sodium ions and negatively charged chloride ions. Non-limiting examples include diammonium phosphate, diammonium sulfate and ammonium nitrate.

"Seed" generally refers to an embryonic plant enclosed in a protective outer covering, often with a food reserve.

"Solubility" generally refers to the maximum amount of a substance that will dissolve in a given amount of solvent at a specified temperature.

"Soluble" generally refers to the amount of a substance able to be dissolved, especially in water.

"Solution" generally refers to a homogenous mixture of two or more substances in relative amounts that can be varied continuously up to the limit of solubility. The term solution is commonly applied to the liquid state of matter, but solutions of gases and solids are possible.

"Suspended" generally refers to a particle being in the state of suspension.

"Suspension" generally refers to a heterogeneous mixture of a fluid that contains solid particles sufficiently large for sedimentation. The particles may be visible to the naked eye, usually must be larger than one micrometer, and will eventually settle, although the mixture is only classified as a suspension when and while the particles have not settled out.

"Win Rate" generally refers to a harvest yield increase of plants treated with the PQQ mixture in comparison to the yield of plants not treated with the PQQ mixture.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS

100 flowchart
105 stage
110 stage
115 stage
120 stage

What is claimed is:

1. A composition, comprising:
pyrroloquinoline quinone (PQQ);
diammonium phosphate;
an acid; and
water;
wherein the composition comprises 640 grams of PQQ, 2.5 kilograms of diammonium phosphate per 100 gallons of water, wherein the diammonium phosphate and the acid form a buffer system, and wherein the composition is a storage-stable homogeneous liquid solution.

2. The composition of claim 1, wherein the acid is phosphoric acid.

3. The composition of claim 1, wherein the PQQ is in a powdered form.

4. The composition of claim 1, wherein the PQQ of the composition stays in solution for at least 30 days.

5. The composition of claim 1, wherein the PQQ of the composition stays in solution for at least three years.

6. A method, comprising:
creating a pyrroloquinoline quinone (PQQ) mixture;
adding PQQ, diammonium phosphate, and water to a container;
adding an acid to the container; and
mixing the PQQ mixture until liquified, wherein the PQQ mixture comprises 640 grams of PQQ and 2.5 kilograms of diammonium phosphate per 100 gallons of water, wherein the acid is added in an amount sufficient to provide the PQQ mixture with a pH of about 6.7 to 7.2, wherein the diammonium phosphate and the acid form a buffer system, and wherein the PQQ mixture is a storage-stable liquid solution formulated to increase the solubility and stability of PQQ in solution for large-scale agricultural application.

7. The method of claim 6, further comprising purifying the water through a reverse osmosis purification process.

8. The method of claim 6, further comprising extracting PQQ from bacteria.

9. The method of claim 8, wherein the bacteria includes methylotrophic bacteria.

10. The method of claim 6, wherein the PQQ mixture is mixed between 18.3° C.-48.9° C.

11. The method of claim 6, further comprising applying the PQQ mixture to a foliar of a plant.

12. The method of claim 6, further comprising applying the PQQ mixture in a furrow of soil.

13. The method of claim 6, further comprising applying the PQQ mixture to a seed.

14. The composition of claim 1, wherein the pH of the PQQ mixture is between 6.7 and 7.2.

15. The composition of claim 1, wherein the acid protonates nitrogen in the PQQ to form a conjugate acid.

16. The composition of claim 1, wherein the PQQ remains dissolved without phase separation for at least 30 days when stored at 4.4° C. to 25° C.

17. A composition, comprising:

pyrroloquinoline quinone (PQQ);

diammonium phosphate;

an acid; and water;

wherein the composition comprises 2560 grams of PQQ, 2.5 kilograms of diammonium phosphate per 100 gallons of water, wherein the diammonium phosphate and the acid form a buffer system, wherein the acid is present in an amount sufficient to provide the composition with a pH of about 6.7 to 7.2, and wherein the composition is a storage-stable homogeneous liquid solution.

18. The composition of claim 17, wherein the acid is phosphoric acid.

19. The composition of claim 18, wherein the phosphoric acid protonates nitrogen in the PQQ to form a conjugate acid.

20. The composition of claim 17, wherein the PQQ of the composition stays in solution for at least three years.

* * * * *